Feb. 23, 1971    H. THIRKELL    3,565,573
REMOVAL OF ACIDIC GASES FROM GASEOUS MIXTURES
Filed Jan. 14, 1966
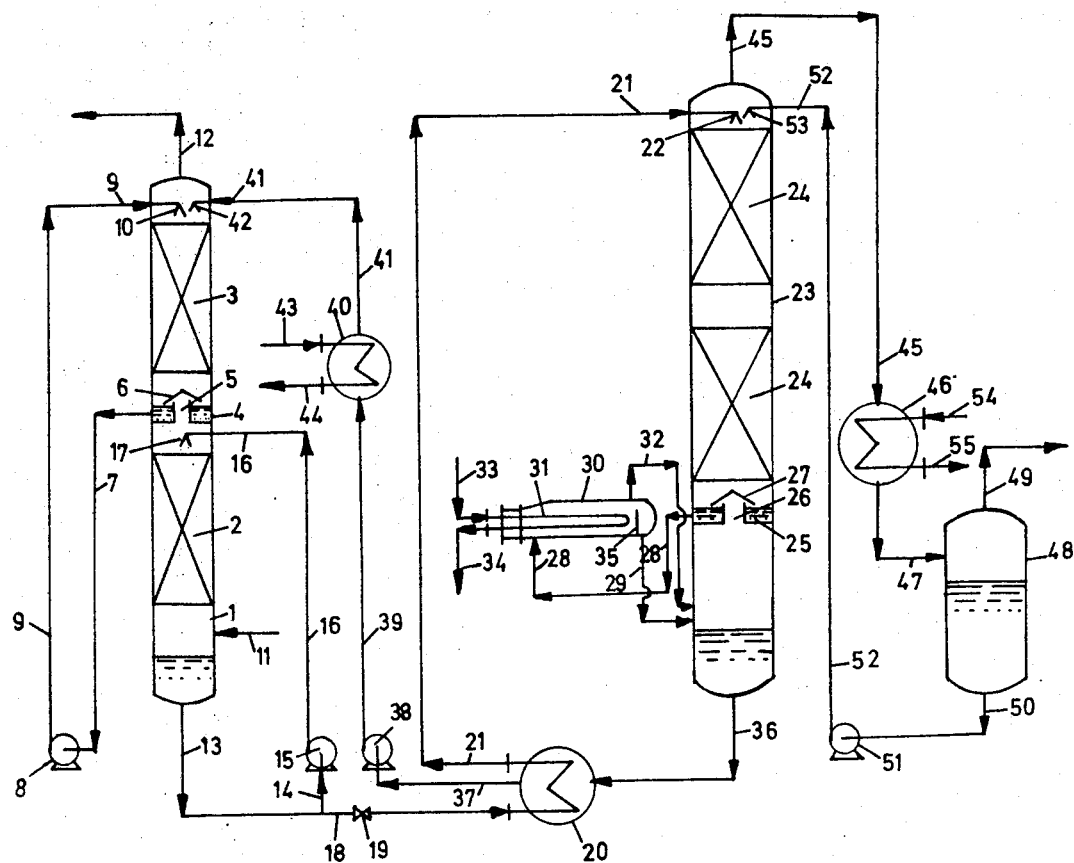
INVENTOR:
HARRY THIRKELL
BY
ATTORNEYS United States Patent Office 3,565,573
Patented Feb. 23, 1971

3,565,573
REMOVAL OF ACIDIC GASES FROM
GASEOUS MIXTURES
Harry Thirkell, Acklam, England, assignor to The Power-Gas Corporation Limited, Durham, England
Filed Jan. 14, 1966, Ser. No. 520,602
Claims priority, application Great Britain, Jan. 23, 1965, 3,063/65
Int. Cl. B01d 53/00, 53/34
U.S. Cl. 23—2
19 Claims

ABSTRACT OF THE DISCLOSURE

Acidic gases are removed from gaseous mixtures by passing the gaseous mixtures through an absorber in contact with an absorbent consisting of a solution of an alkanolamine or an aqueous solution of a strong base and a weak organic acid, the absorber being provided with at least two separate zones of packing material and a portion of the absorbent liquor being separately recirculated through each separate zone, regenerating and cooling the absorbent liquor and passing the cooled regenerated absorbent liquor to the absorber at such a rate that the absorbent liquor leaving the absorber has a low pickup of acid gas.

---

The present invention relates to a process for the removal of acidic gases such as carbon dioxide ($CO_2$) and hydrogen sulphide ($H_2S$) from gaseous mixtures containing a low concentration of said acidic gas or gases, and particularly to obtaining a purified gaseous mixture containing only a trace of said acidic gas or gases.

In known processes for the removal of acidic gases from gaseous mixtures the gaseous mixture is scrubbed with an absorbent liquor in an absorber, where the acidic gases are removed, and the "spent" liquor leaving the absorber is passed to a regenerator where the liquor is heated and stripped with solvent vapour, usually steam, resulting in the regeneration of the liquor and the evolution of $CO_2$ and/or $H_2S$ from the liquor. The hot regenerated liquor leaving the regenerator is passed, with or without cooling, to the absorber and the evolved acidic gases are passed from the regenerator to a cooler/condenser in which the gases are cooled and solvent vapour condensed out. The condensate is separated from the cooled acidic gases in a separator/accumulator and is returned to the regenerated liquor, usually by passing to the top of the regenerator as reflux.

The absorber is preferably a tower-type vessel which may be provided with a number of bubble type or sieve-plate trays, or with one or more zones of packing material, such as contact rings. The regenerated absorbent liquor enters the absorber at the top and passes downwardly through the trays, or zone or zones of packing material, so that the spent absorbent liquor leaves the absorber at the bottom. The feed gaseous mixture enters the absorber near the bottom and passes upwardly through the trays, or zone or zones of packing material, the purified gaseous mixture leaving the absorber at the top.

The regenerator is also preferably a tower-type vessel of a construction similar to that of the absorber. Heated spent absorbent liquor leaving the absorber is passed to the regenerator near the top and passes downwardly through the trays, or zone or zones of packing material, on to a collecting tray, from where it passes to a reboiler and back to the lower section of the regenerator. Hot regenerated absorbent liquor leaves the regenerator at the bottom and the acidic gases together with stripping solvent vapour leave the regenerator at the top, passing to the cooler/condenser.

The concentration of an acidic gas in the purified gaseous mixture leaving the absorber is limited by the vapour pressure of the acidic gas in equilibrium with the regenerated absorbent liquor entering the absorber, which is dependent on the composition of the absorbent liquor and decreases with decreasing concentration of the acidic gas remaining dissolved in the liquor and with decreasing temperature of the liquor.

To obtain a low concentration of an acidic gas in the purified gaseous mixture a suitable absorbent liquor, such as a solution of an alkanolamine or an aqueous solution of a strong base and a weak organic acid, must be sufficiently regenerated and cooled before entering the absorber. The solution of an alkanolamine may be an aqueous solution or a solution in an organic solvent such as sulfolane (tetrahydrothiophene oxide).

Such suitable absorbent liquors, in particular aqueous solutions of ethanolamines and aqueous solutions of the potassium salts of alkylamino fatty acids, have been used on the industrial scale for the removal of $CO_2$ and/or $H_2S$ from various industrial gases and natural gas containing generally from 3 to 30% by volume of acidic gases. In many cases the requirements and operating conditions have been such that the purified gas has contained from 0.1 to 3% of acidic gases.

Where it is acceptable for the purified gas to contain from 0.1 to 3% by volume of acidic gases, alternative processes to a process using said suitable absorbent liquors are available and used which may be more economic. Such processes include a process of the type described using a hot aqueous solution of potassium carbonate as absorbent liquor, with or without the addition of a substance for promoting increased solubility and/or absorption rate of an acidic gas, absorption of $CO_2$ in water under pressure and regeneration of water containing $CO_2$ by air, and absorption of $H_2S$ in a reagent liquor and oxidation of the spent liquor by air to form sulphur, with regeneration of the liquor.

It is known to remove acidic gases from an industrial gas by one of said alternative processes so that the purified gas contains from 0.1 to 3% by volume of acidic gases and to further purify said purified gas by a process of the type described using a said suitable absorbent liquor. Since the concentration of acidic gases in said purified gas is low the required amount of absorbent liquor in circulation is comparatively small, even with a comparatively low pickup of acidic gases in the spent absorbent liquor, and this is a factor in the design of the absorber required in the further purification step. Generally an absorption tower containing one or more zones of packing material is cheaper to construct than an absorption tower provided with a number of bubble-type or sieve-plate trays. However, at a low rate of absorbent liquor passing down the tower the liquid film coefficient of absorption is low and the packing material, such as contact rings, may not be completely wetted, resulting in a low rate of mass transfer of the acidic gases into the absorbent liquor. Consequently, if only a trace of acidic gas or gases is to be obtained in the further purified gas the total required height of packing material becomes high, necessitating either a single absorption tower which is inconveniently tall or two absorption towers in series with a liquor delivery pump in between.

According to the present invention there is provided a process for the removal of acidic gases from gaseous mixtures which comprises passing the gaseous mixture through an absorber in contact with an absorbent liquor consisting of a solution of an alkanolamine or an aqueous solution of a strong base and a weak organic acid, the absorber being provided with at least two separate zones of packing material and a portion of the absorbent liquor being separately recirculated through each said separate zone, passing the absorbent liquor containing the acidic gases dissolved therein into a regenerator where the liquor is heated and stripped with solvent vapour, resulting in the regeneration of the liquor and the evolution of acidic gases, passing the acidic gases together with solvent vapour to a cooler/condenser in which the gases are cooled and solvent vapour condensed out as condensate, separating the condensate from cooled acidic gases in a separator/accumulator, returning the condensate to the regenerated absorbent liquor, cooling the regenerated absorbent liquor from the regenerator to near ambient temperature and passing the cooled regenerated absorbent liquor to the absorber at such rate that the absorbent liquor leaving the absorber has a low pickup of acidic gases.

The pickup of acidic gases in the absorbent liquor leaving the absorber can be defined as the quantity of acidic gases removed from the entering gaseous mixture per unit quantity of absorbent and is equal to the quantity of acidic gases contained in the absorbent liquor leaving the absorber per unit quantity of absorbent less the quantity of acidic gases contained in the regenerated absorbent liquor entering the absorber per unit quantity of absorbent. Where the regenerated adsorbent liquor is substantially completely regenerated the quantity of acidic gases contained therein per unit quantity of absorbent is negligible.

In known processes where the regenerated absorbent liquor enters at the top of the absorber and the spent absorbent liquor leaves at the bottom of the absorber, without recirculation of liquor through the absorber it is usual to operate at around a "normal" pickup of acidic gases for a given absorbent, the rate of flow of the absorbent liquor being sufficient but not in unnecessary excess. For example, when absorbing carbon dioxide from gaseous mixtures using an aqueous solution of monoethanolamine as absorbent liquor, a normal pickup of carbon dioxide would be from 0.4 to 0.45 mol carbon dioxide per mol monoethanolamine.

In the process of the present invention the regenerated absorbent liquor is passed to the top of the absorber at a rate flow so that the pickup of acidic gases in the absorbent liquor leaving the absorber is low compared with the normal pickup in known processes involving no recirculation of liquor through the absorber.

In a preferred embodiment of the present invention the bulk of the acidic gases are first removed by any suitable process.

The process of the present invention is particularly suitable for the removal of acidic gases from gaseous mixtures containing a low concentration of acidic gases, say from 0.1 to 3% by volume, so that where an initial gaseous mixture has a comparatively high concentration of acidic gases the removal of acidic gases is carried out in two stages, the process of the invention constituting the second stage.

A preferred absorbent liquor is an aqueous solution of monoethanolamine containing from 5% to 25% by weight monoethanolamine, but the invention is not limited to this absorbent liquor.

The absorber may consist of a tower-type vessel provided with a zone of packing material, such as contact rings, in its lower part, surmounted by one or more separate zones of packing material further up the vessel, each such zone being located above a liquor collecting tray provided with a central opening.

Regenerated liquor is passed to the top of the absorber and the feed gaseous mixture enters the absorber near the bottom and passes upwardly through the absorber, passing through the central opening in each liquor collecting tray. The liquor which collects on each collecting tray is passed to a pump which delivers the liquor to the top of the zone of packing material above the liquor collecting tray, thus causing recirculation of liquor through this zone. A part of the liquor which collects on each collecting tray, equivalent to the amount of regenerated liquor entering the absorber, passes to the zone of packing material below. Spent liquor leaving the bottom of the absorber is passed to a pump which delivers the liquor to the top of the lowermost zone of packing material, thus causing recirculation of liquor through this zone. A part of the spent liquor leaving the bottom of the absorber, equivalent to the amount of regenerated liquor entering the absorber is passed, through a regulating valve to the regenerator.

The hot regenerated liquor leaving the regenerator may be cooled by indirect heat exchange with the spent liquor leaving the absorber on its way to the regenerator, and then further cooled to near ambient temperature by heat exchange with cooling water or air. The near ambient temperature to which the regenerated liquor is cooled is generally between 5 and 20° C. above the ambient temperature.

Regenerator of the spent liquor in the regenerator may take place at around atmospheric pressure to about 50 p.s.i.g., depending on the composition of the absorbent liquor and the required degree of regeneration of the liquor. Where it is required that the purified gaseous mixture contains only a trace, say from 1 to 20 parts per million, of acidic gas or gases, regeneration of the spent liquor should be substantially complete.

In the process of the present invention recirculation of the absorbent liquor through each separate zone of packing material causes adequate wetting of the packing material and an increased liquor rate passing through each zone, resulting in an increased liquid film coefficient of absorption and consequently an increased rate of mass transfer of the acidic gases into the absorbent liquor. This results in the advantage, particularly when only a trace of acidic gas or gases is to be obtained in the purified gas, that the total required height of packing material is reduced, and a single absorption tower of a convenient height will suffice.

The liquid film coefficient of absorption is related to the "two-film" theory of absorption, which conceives that there is an interface between the gas and liquid phases and for a short distance into each phase there is a region essentially free from convection currents. This region includes, on one side of the interface, a thin layer or film of relatively stagnant gas and, on the other side, a thin layer or film of relatively stagnant liquid. The liquid film coefficient of absorption is expressed as the mass of soluble acidic gas transferred per unit time, per unit transfer surface of the interface, per unit concentration difference of the acidic gas in the liquid at the interface and in the main body of the liquid. The mechanism of the transfer of acidic gas through the liquid film is principally one of diffusion and the rate of transfer is increased as the depth of the liquid film is decreased. The depth of the liquid film is decreased by increasing the velocity of liquid in the main body of liquid, i.e., by increasing the liquor rate passing through the zone of packing material.

The invention will be further described by way of example with reference to the accompanying drawing, which is a flow diagram of an embodiment of the invention.

Referring to the drawing, an absorber 1 is provided with a zone 2 of packing material in its lower part and a zone 3 of packing material in its upper part. Between the zones 2 and 3 there is a liquor collecting tray 4 provided with a central opening duct 5 surmounted by a cowl 6.

Regenerated absorbent liquor, cooled to near ambient temperature, enters the absorber near its top through conduit 41 and spray device 42, passes through the packing material in the zone 3 and collects on the liquor collecting tray 4. The collected liquor passes from the tray 4 through conduit 7 to a liquor circulating pump 8 which delivers the liquor through conduit 9 and spray device 10 to the absorber near its top, above the zone 3. A suitable liquor recirculation rate through the zone 3 is maintained by the pump 8 and excess liquor above the recirculation rate, equivalent to the amount of regenerated liquor entering through the conduit 41, overflows from the collecting tray 4 through the central opening duct 5 as a film on the inside wall of the duct, and passes through the packing material in the zone 2. The "spent" liquor passes out at the bottom of the absorber through conduit 13 and then through conduit 14 to a liquor circulating pump 15 which delivers the liquor through conduit 16 and spray device 17 to the absorber at a point above the zone 2. A suitable liquor recirculation rate through the zone 2 is maintained by the pump 15 and excess of liquor above the recirculation rate, equivalent to the amount of liquor entering through the duct 5, is passed through conduit 18 to a regenerator 23. The feed gaseous mixture enters the absorber near the bottom through conduit 11, and passes upwardly through the packed zone 2, central opening duct 5, and packed zone 3, the purified gaseous mixture leaving the absorber at the top through conduit 12.

In the embodiment according to the drawing the absorber 1 is under pressure and spent liquor from the absorber is passed to the regenerator 23 by regulating a valve 19 in the conduit 18. The spent liquor first passes through the tubes of a heat exchange 20 in which it is heated by hot regenerated liquor passing through the shell side of the heat exchanger. The heated spent liquor leaving the heat exchanger 20 is passed through conduit 21 and spray device 22 into the regenerator 23 near its top. The regenerator 23 is provided with zones 24 of packing material, such as contact rings, and in its lower part with a liquor collecting tray 25 provided with a central opening duct 26 surmounted by a cowl 27. The heated spent liquor passes downwardly through the packed zones 24 countercurrent to rising solvent vapour, usually steam, becoming increasingly stripped of acidic gases, which are evolved. The stripped liquor collects on the liquor collecting tray 25 and passes by gravity through conduit 28 to a reboiler 30 which is heated by a heating medium, such as steam, passing through the heating tubes 31, entering through conduit 33 and leaving through conduit 34. A weir 35 is provided in the reboiler to ensure that the liquor covers the heating tubes 31. Solvent vapour, usually steam, is raised from the liquor in the reboiler and passes out through conduit 32 into the lower part of the regenerator. Unevaporated liquor passes out of the reboiler through conduit 29 and is returned by gravity to the lower part of the regenerator.

Since it is desirable that the recirculated absorbent liquor which enters at the top of this lowermost packed zone should not have a vapour pressure of acidic gases which is too high, the quantity of acidic gases contained in the absorbent liquor leaving the absorber per unit quantity of absorbent must be comparatively low. This is achieved by passing the regenerated absorbent liquor to the top of the absorber at a rate of flow so that the pick-up of acidic gases in the absorbent liquor leaving the bottom of the absorber is low compared with the "normal" pickup in the known process without recirculation of liquor through the absorber.

The hot regenerated liquor passes out at the bottom of the regenerator 23 through conduit 36 to the shell side of the heat exchanger 20, out of which the cooled regenerated liquor passes through conduit 37 to pump 38 which delivers the liquor through a cooler 40 and conduit 41 into the absorber 1 near the top. The cooled regenerated liquor leaving the heat exchanger 20 is further cooled to near ambient temperature in the cooler 40 by means of cooling water entering the tube-side through conduit 43 and leaving through conduit 44.

Acidic gases, saturated with solvent vapour, usually steam, leave the top of the regenerator through conduit 45 and pass to a cooler/condenser 46 in which the gases are cooled by indirect heat exchange with cooling water entering through conduit 54 and leaving through conduit 55. The cooled gases and condensate pass through conduit 47 to a separator/accumulator 48, in which the condensate accumulates and from the top of which the condensate-free gases pass out through conduit 49. Condensate is withdrawn from the bottom of the separator/accumulator 48 through conduit 50 and passes to a pump 51 which delivers it through conduit 52 and spray device 53 into the regenerator, near the top, as reflux.

In the embodiment of the invention according to the drawing the absorber 1 is shown with only one packed zone 3 above a liquor collecting tray 4 provided with a central opening duct 5, and this is usually sufficient in practice. However, the absorber may be provided, if required, with two or more such packed zones 3, each surmounting a liquor collecting tray corresponding to the tray 4, and the liquor which collects on each such tray is recirculated through each said zone by means of a separate liquor pump.

EXAMPLE

In an arrangement of process flow and equipment according to the accompanying drawing, but with the liquor pump 38 delivering regenerated liquor to the absorber 1 placed after the cooler 40, so that the regenerated liquor passes through the heat exchange 20 and cooler 40 in series under its pressure in the regenerator 23, the following example further illustrates the invention.

The feed gaseous mixture entering the absorber 1 through conduit 11 is cooled gas after removal of $CO_2$ in an absorber with hot potassium carbonate liquor. It contains 0.3% by volume of $CO_2$ and is at 38° C. and 327 p.s.i.g., saturated with water vapour.

The absorbent liquor is initially an aqueous solution of monoethanolamine containing 20% by weight of monoethanolamine.

The feed gaseous mixture is passed at the rate of 1,128,000 s.c.f. (standard cubic feet) per hour and the regenerated absorbent liquor enters the absorber through conduit 41 at 38° C and at the rate of 24.6 gals. per minute, the ambient temperature being about 23° C.

The absorber 1 is a 6'-0" diameter tower with two zones, each 22 ft. high, packed with 1½" Raschig rings, corresponding to the zones 2 and 3, respectively.

Liquor is recirculated through each of the zones 2 and 3 by pumps 15 and 8, respectively, at the rate of 82.7 gals. per minute.

The purified gas leaving the top of the absorber through conduit 12 contains 10 parts per million of $CO_2$.

The spent liquor leaves the bottom of the absorber at 49.6° C. and contains $CO_2$ pickup equal to 0.181 mol $CO_2$ per mol monoethanolamine.

The regenerated liquor at the bottom of the regenerator 23 is at 138° C. and 35 p.s.i.g., and is substantially completely regenerated.

The total power consumption for feeding regenerated liquor to the absorber by pump 38 and recirculating liquor through zones 2 and 3 in the absorber by pumps 15 and 8, respectively, is calculated at 29.3 BHP.

For an equivalent performance to the above, without recirculating liquor through separate packed zones according to the present invention, it is calculated that the required absorber is either (1) a single 4'-9" diameter tower with a total packed height=119 ft. using 1½" Raschig rings (say 5 packed zones each of 23.8 ft.) or (2) two 4'-9" diameter towers in series with a liquor delivery pump in between, the first tower containing a total packed height=44 ft. and the second tower containing a total packed height=62 ft., in each case using 1½" Raschig rings.

In case (1) the total power consumption for delivering liquor to the absorber is 21.4 BHP and in case (2) the total power consumption for delivering liquor to the absorbers is 22.9 BHP.

From the above figures the economic advantage of the absorber according to the present invention is apparent. Although a greater total power consumption is required for the process of the present invention (as compared to processes (1) and (2) above) owing to the power required for recirculating the absorbent liquor through the absorber, this is more than outweighed by the economic advantage of the smaller absorption tower used and consequently the smaller quantity of packing material required.

I claim:

1. In a process for the removal of acidic gases from gaseous mixtures which comprises passing the gaseous mixture through an absorber in contact with an absorbent liquor, said absorber being provided with at least two separate zones of packing material, passing the absorbent liquor containing the acidic gases dissolved therein into a regenerator where the liquor is heated and stripped with solvent vapour, resulting in the regeneration of the liquor and the evolution of acidic gases, passing the acidic gases together with solvent vapour to a cooler/condenser in which the gases are cooled and solvent vapour condensed out as condensate, separating the condensate from the cooled acidic gases in a separator/accumulator, returning the condensate to the regenerated absorbent liquor, and cooling the regenerated absorbent liquor to near ambient temperature, the improvement which comprises passing throughout said absorber a single absorbent liquor selected from the group consisting of a solution of an alkanolamine and an aqueous solution of a strong base and a weak organic acid, a portion of said absorbent liquor being separately recirculated through each said separate zone and passing said cooled regenerated absorbent liquor to said absorber at such a rate that the absorbent liquor leaving the absorber has a low pickup of acidic gases.

2. A process according to claim 1, wherein the packing material is comprised of a plurality of contact rings.

3. A process according to claim 1, wherein the acidic gases comprise at least one member selected from the group consisting of carbon dioxide and hydrogen sulphide.

4. A process according to claim 1, wherein the solution of an alkanolamine is an aqueous solution of an ethanolamine.

5. A process according to claim 1, wherein the solution of an alkanolamine is a solution of an ethanolamine in an organic solvent.

6. A process according to claim 1, wherein the solution of an alkanolamine is an aqueous solution of monoethanolamine containing from 5 to 25% by weight of monoethanolamine.

7. A process according to claim 1, wherein the aqueous solution of a strong base and a weak organic acid is an aqueous solution of a potassium salt of an alkylamino fatty acid.

8. A process according to claim 1, wherein the absorbent liquor leaving the absorber is regenerated substantially completely, so that the purified gaseous mixture contains only a trace of acidic gas or gases.

9. A process according to claim 1, wherein the bulk of the acidic gases are removed prior to passing the gaseous mixture to the absorber.

10. A process for the removal of acidic gases from gaseous mixtures which comprises passing the gaseous mixture through an absorber in contact with an absorbent liquor selected from the group consisting of a solution of an alkanolamine and an aqueous solution of a strong base and a weak organic acid, said absorber including a tower type vessel, a first zone of packing material in the lower part of said vessel and at least one separate zone of packing material in said vessel surmounting said first zone of packing material, a liquor collecting bay located beneath each said separate zone and a central duct associated with each said collecting tray; separately recirculating a portion of the absorbent liquor through each said zone of packing material, passing the absorbent liquor containing the acidic gases dissloved therein into a regenerator where the liquor is heated and stripped with solvent vapour, resulting in the regeneration of the liquor and the evolution of acidic gases, passing the acidic gases together with solvent vapour to a cooler/condenser in which the gases are cooled and solvent vapour condensed out as condensate, separating the condensate from the cooled acidic gases in a separator/accumulator, returning the condensate to the regenerated absorbent liquor, cooling the regenerated absorbent liquor from the regenerator to near ambient temperature and passing the cooled regenerated absorbent liquor to the absorber at such a rate that the absorbent liquor leaving the absorber has a low pickup of acidic gases.

11. A process according to claim 10, wherein the regenerated absorbent liquor enters the absorber at an upper region thereof and passes downwardly through the zones of packing material, the feed gaseous mixture enters the absorber near the bottom and passes upwardly through the zones of packing material, liquor collects on each collecting tray and passes to a pump which delivers a portion of the liquor to the top of the zone of packing material above each liquor collecting tray, and spent liquor leaving the bottom of the absorber is passed to a pump which delivers a portion of the liquor to the top of the lowermost zone of packing material.

12. A process according to claim 10, wherein the packing material is comprised of a plurality of contact rings.

13. A process according to claim 10, wherein the acidic gases comprise at least one member selected from the group consisting of carbon dioxide and hydrogen sulphide.

14. A process according to claim 10, wherein the solution of an alkanolamine is an aqueous solution of an ethonolamine.

15. A process according to claim 10, wherein the solution of an alkanolamine is a solution of an ethanolamine in an organic solvent.

16. A process according to claim 10 wherein the solution of an alkanolamine is an aqueous solution of monoethanolamine containing from 5 to 25% by weight of monoethanolamine.

17. A process according to claim 10, wherein the aqueous solution of a strong base and a weak organic acid is an aqueous solution of a potassium salt of an alkylamino fatty acid.

18. A process according to claim 10, wherein the absorbent liquor leaving the absorber is regenerated substantially completely, so that the purified gaseous mixture contains only a trace of acidic gas or gases.

19. A process according to claim 10, wherein the bulk of the acidic gases are removed prior to passing the gaseous mixture to the absorber.

References Cited

UNITED STATES PATENTS

| | | | |
|---|---|---|---|
| 1,897,725 | 2/1933 | Gaus et al. | 23—2X |
| 2,524,088 | 10/1950 | Shaw | 23—2 |
| 2,878,099 | 3/1959 | Breuing et al. | 23—2 |
| 2,886,405 | 5/1959 | Benson et al. | 23—3 |
| 3,039,251 | 6/1962 | Kamlet | 23—2X |
| 3,042,483 | 7/1962 | Wolfram et al. | 23—2 |

EARL C. THOMAS, Primary Examiner